United States Patent
Fujita et al.

(10) Patent No.: US 12,530,428 B2
(45) Date of Patent: Jan. 20, 2026

(54) ANALYSIS METHOD AND DIAGNOSIS ASSISTANCE METHOD

(71) Applicant: SHIMADZU CORPORATION, Kyoto (JP)

(72) Inventors: Yuichiro Fujita, Kyoto (JP); Akira Noda, Kyoto (JP); Yusuke Tamai, Kyoto (JP); Yoshihiro Yamada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 623 days.

(21) Appl. No.: 17/729,906

(22) Filed: Apr. 26, 2022

(65) Prior Publication Data

US 2022/0382834 A1    Dec. 1, 2022

(30) Foreign Application Priority Data

May 26, 2021    (JP) .................................. 2021-088825

(51) Int. Cl.
*G06F 17/18*    (2006.01)
*G01N 30/86*    (2006.01)

(52) U.S. Cl.
CPC ......... *G06F 17/18* (2013.01); *G01N 30/8631* (2013.01); *G01N 30/8693* (2013.01)

(58) Field of Classification Search
CPC . G06F 17/18; G01N 30/8631; G01N 30/8693
See application file for complete search history.

(56) References Cited

U.S. PATENT DOCUMENTS

| | | | |
|---|---|---|---|
| 6,025,360 A | 2/2000 | Miller et al. | |
| 2006/0217938 A1 | 9/2006 | Tracy et al. | |
| 2012/0271556 A1* | 10/2012 | Szacherski | G16B 40/10 702/22 |
| 2013/0238252 A1 | 9/2013 | Perenon et al. | |
| 2016/0217986 A1 | 7/2016 | Denny et al. | |
| 2019/0277817 A1 | 9/2019 | Yamaguchi | |

FOREIGN PATENT DOCUMENTS

| | | |
|---|---|---|
| WO | 2004/068078 A1 | 8/2004 |
| WO | 2018/087824 A1 | 5/2018 |

OTHER PUBLICATIONS

House et al., "Bayesian Nonparametric Models for Peak Identification in MALDI-TOF Mass Spectroscopy" The Annals of Applied Statistics 2011, vol. 5, No. 2B, 1488-1511 (Year: 2011).*

(Continued)

*Primary Examiner* — John C Kuan
(74) *Attorney, Agent, or Firm* — Muir Patent Law, PLLC

(57) ABSTRACT

An analysis method for analyzing a sample includes a first step of acquiring measurement data including a first signal based on the sample and a second signal based on noise added to the first signal as a result of analysis of the sample, a second step of assuming a shape representing the first signal and a shape representing the second signal and modeling the measurement data using Bayesian inference, and a third step of estimating a probability distribution of characteristics of the sample based on the modeled measurement data.

19 Claims, 11 Drawing Sheets

(56) References Cited

OTHER PUBLICATIONS

Ipsen, "Derivation of the Statistical Distribution of the Mass Peak Centroids of Mass Spectrometers Employing Analog-to-Digital Converters and Electron Multipliers" Anal. Chem. 2017, 89, 2232â2241 (Year: 2017).*

Kelly et al., "Application of Method of Maximum Posterior Probability to Estimation of Gas-Chromatographic Peak Parameters" Analytical Chemistry, vol. 43, No. 10, Aug. 1971 (Year: 1971).*

Zhang et al., "Bayesian Peptide Peak Detection for High Resolution TOF Mass Spectrometry" IEEE Trans Signal Process. Nov. 1, 2010; 58(11): 5883-5894 (Year: 2010).*

Office Action dated Aug. 31, 2023 for counterpart Chinese patent application CN 202210555103.9 and English machine translation thereof.

Smooth signal with peaks using nonparametric method—MATLAB mslowess—MathWorks, downloaded May 26, 2021 (this or similar version understood to be introduced as of 2006), URL : https://jp.mathworks.com/help/bioinfo/ref/mslowess.html.

Convert raw peak data to peak list (centroided data)—MATLAB mspeaks—MathWorks, downloaded May 26, 2021 (this or similar version understood to be introduced as of 2007), URL : https://jp.mathworks.com/help/bioinfo/ref/mspeaks. html.

Notice of Reasons for Refusal for corresponding Japanese Patent Application No. 2021-088825, dated Jul. 9, 2024.

Notice of Reasons for Refusal in counterpart Japanese Patent Application No. 2021-088825, dated Feb. 26, 2025, along with English-language machine translation thereof.

* cited by examiner

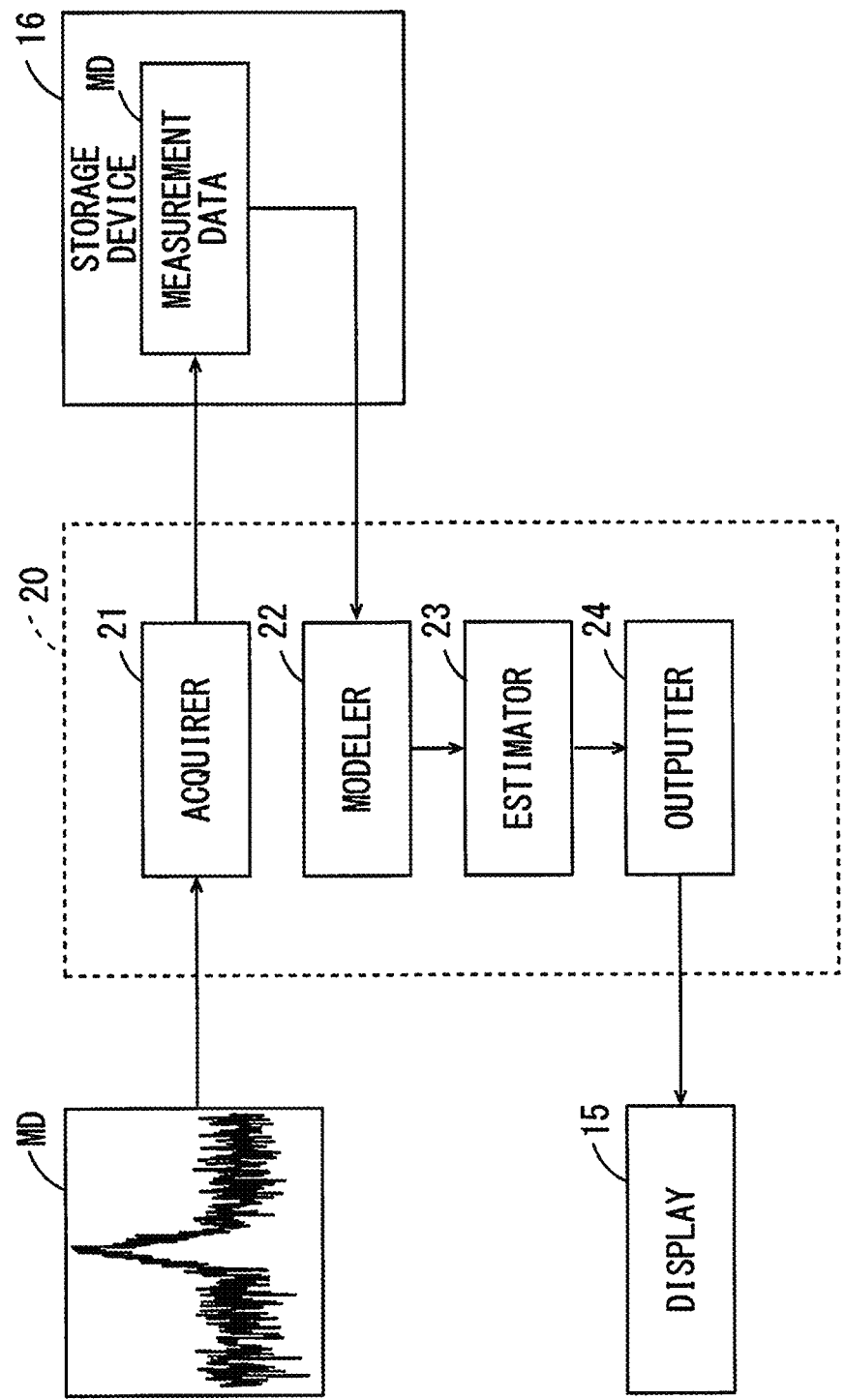
F I G. 2

FIG. 3

PARAMETERS OF SIMULATION DATA
(COMMON AMONG CONCENTRATIONS C1 TO C6)

| CREATION PARAMETER | VALUE | CREATION PARAMETER | VALUE |
|---|---|---|---|
| $\mu$ OF GAUSSIAN PEAK | 0 | m/z RANGE | $-8 \leq m/z \leq 7.95$ |
| $\sigma$ OF GAUSSIAN PEAK | 0.5 | bin WIDTH | 0.05 |
| $\sigma'$ OF GAUSSIAN NOISE | 10 | NUMBER OF DATA POINTS IN m/z DIRECTION | 320 |

FIG. 4

SN RATIO OF SIMULATION DATA

| | C1 | C2 | C3 | C4 | C5 | C6 |
|---|---|---|---|---|---|---|
| TRUE SN RATIO ($\approx$ CONCENTRATION) | 6 | 5 | 4 | 3 | 2 | 1 |
| WEIGHING ERROR | 0.0045 | 0.0010 | 0.0018 | 0.0117 | 0.0055 | 0.0030 |
| ACTUAL SN RATIO | 6.027 | 5.005 | 4.007 | 2.965 | 1.989 | 1.003 |

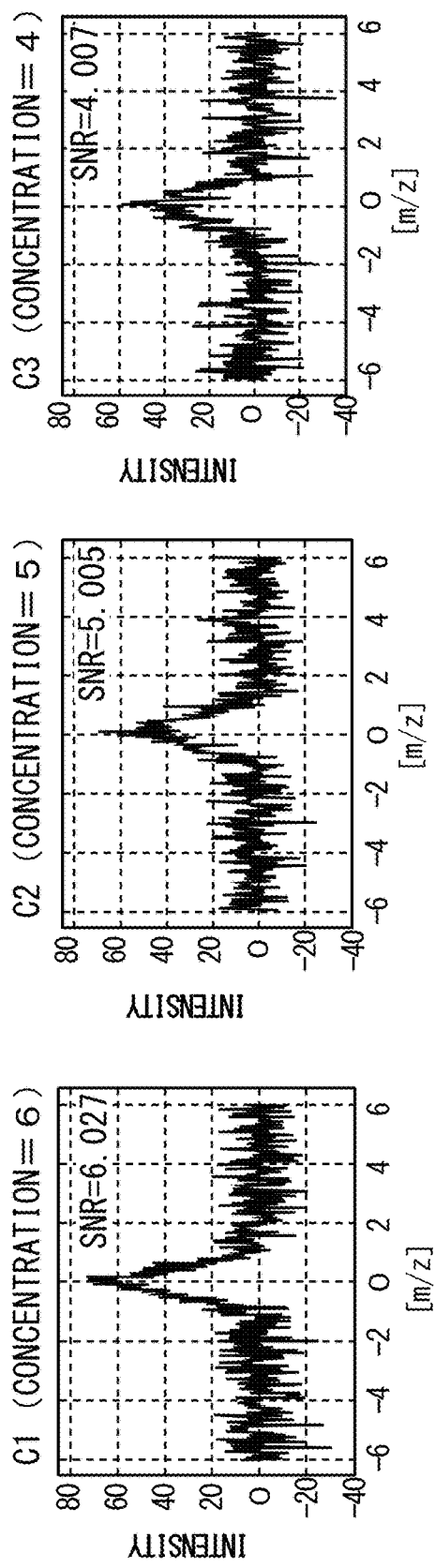
FIG. 5  WAVEFORM APPEARANCE OF SIMULATION DATA

F I G. 6
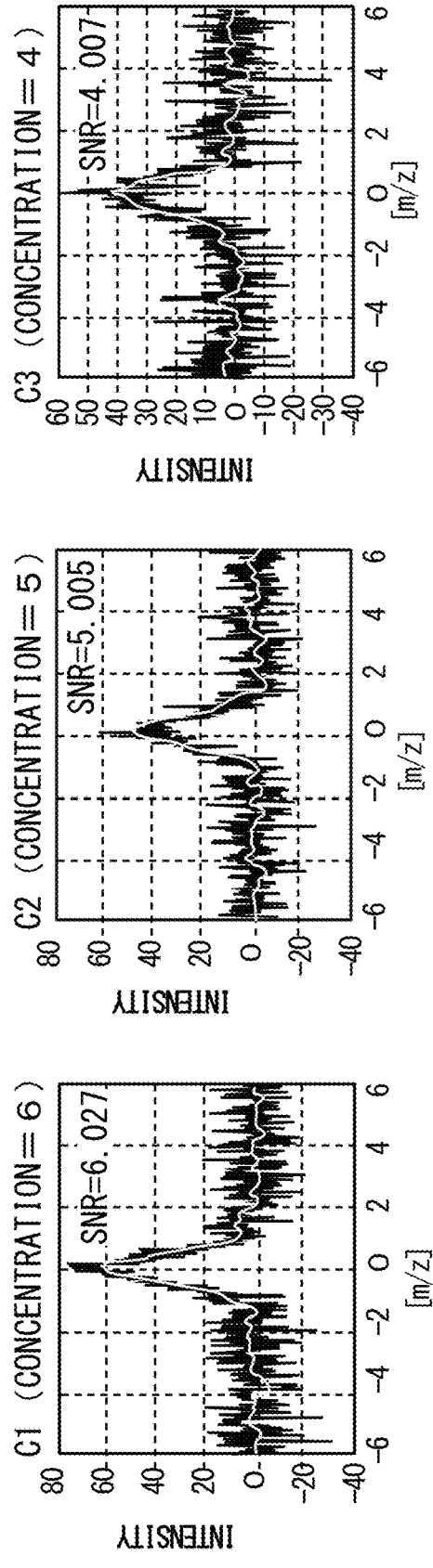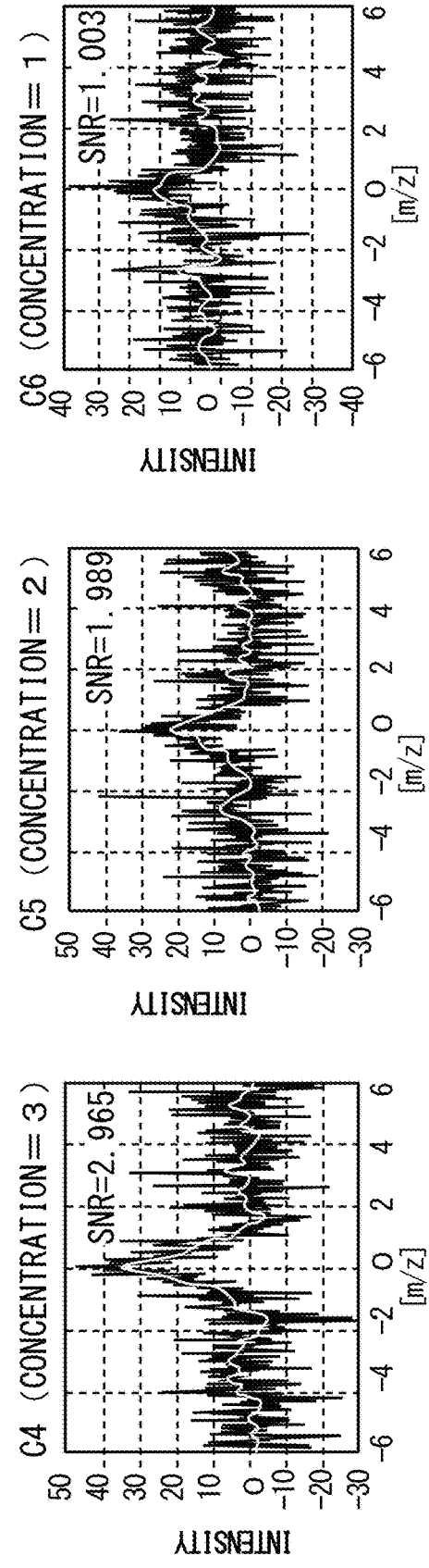
RESULT OF PEAK DETECTION OF SIMULATION DATA OBTAINED IN COMPARATIVE EXAMPLE F I G. 7
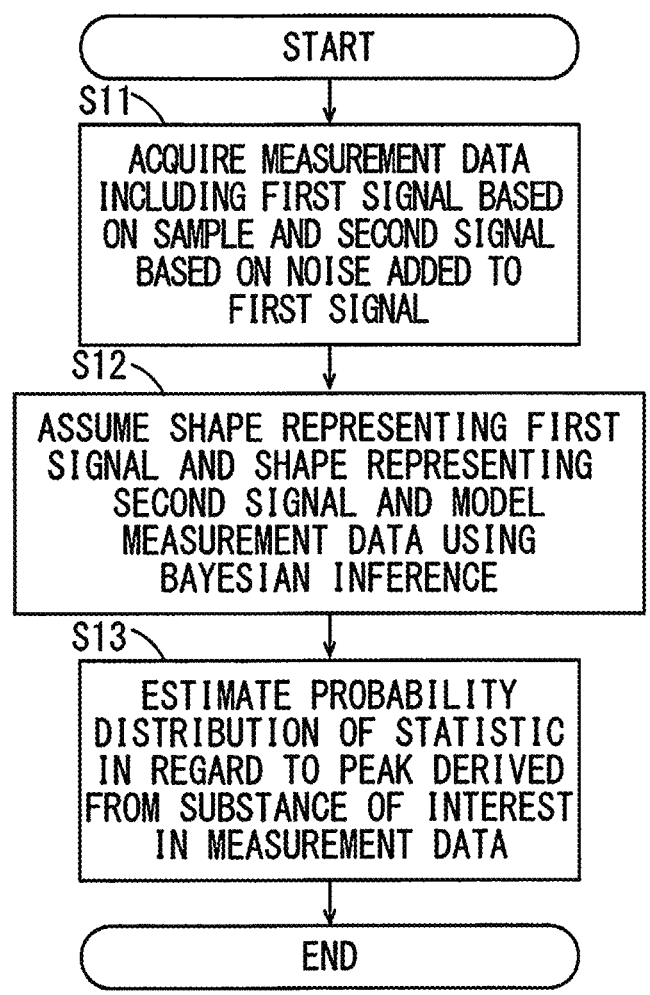

FIG. 8
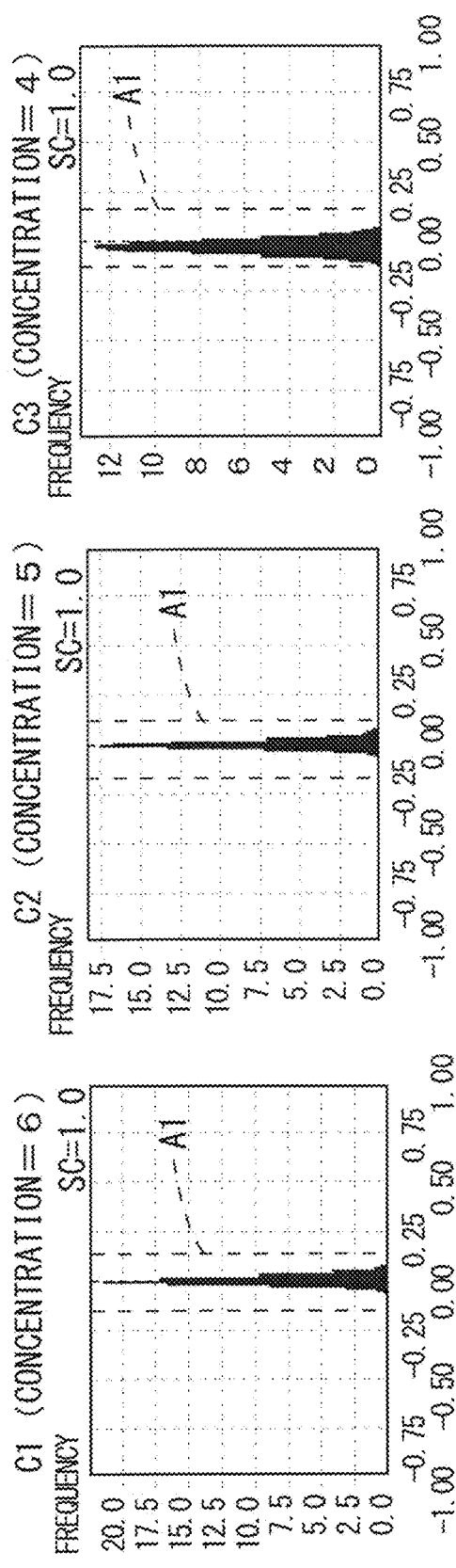
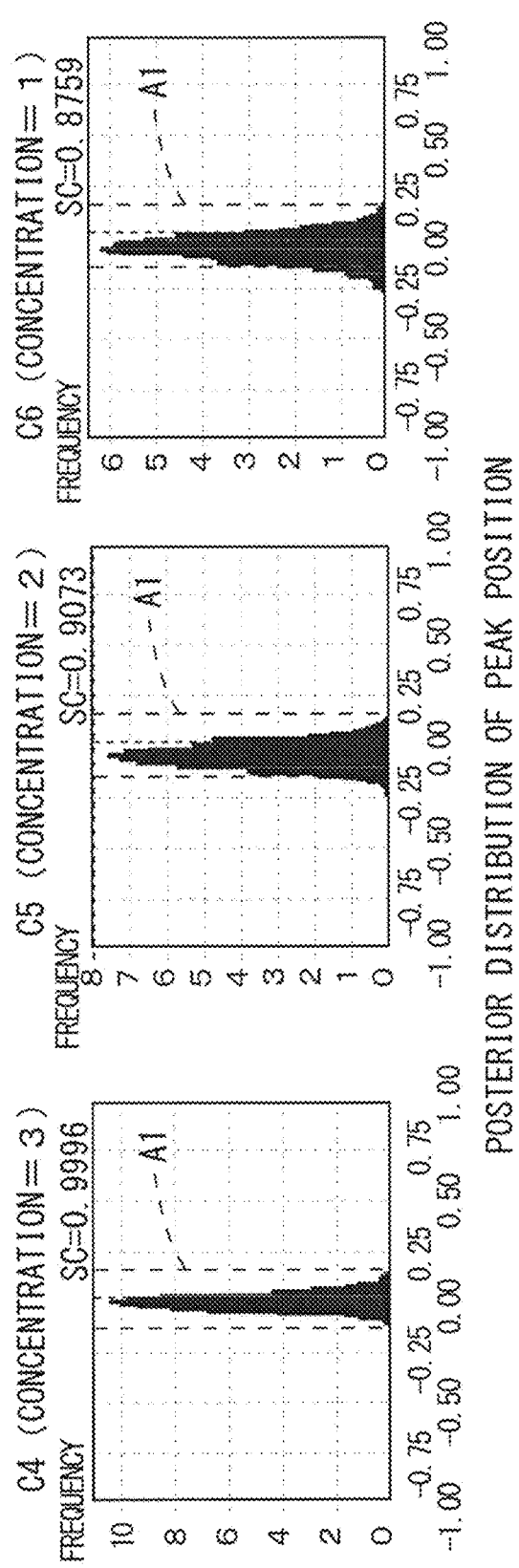
POSTERIOR DISTRIBUTION OF PEAK POSITION

FIG. 9
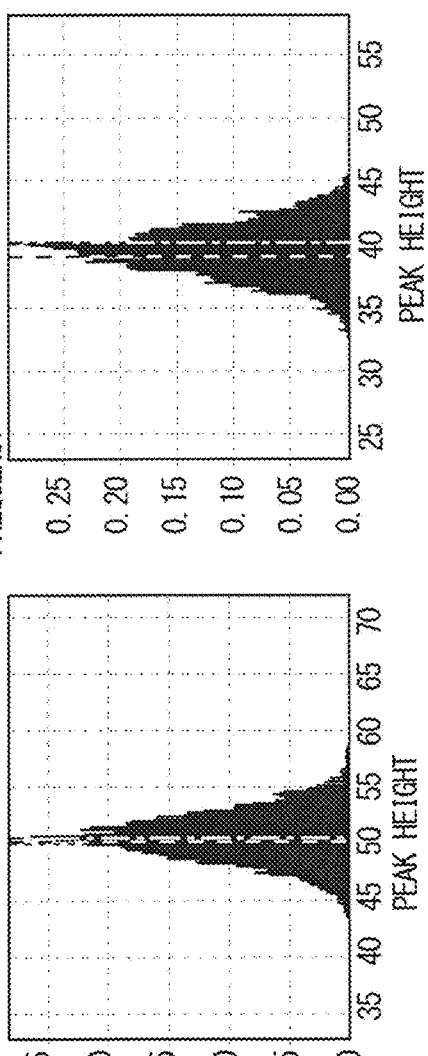
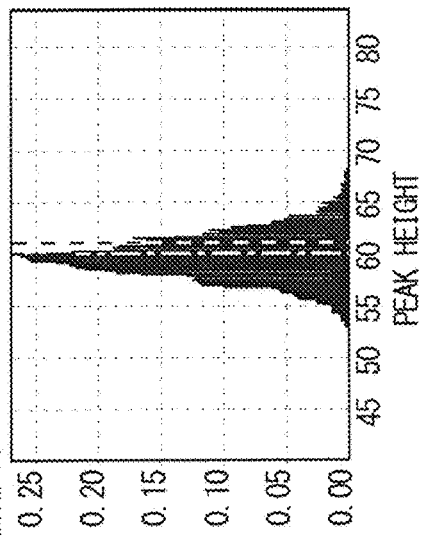
POSTERIOR DISTRIBUTION OF PEAK HEIGHT

F I G. 1 0
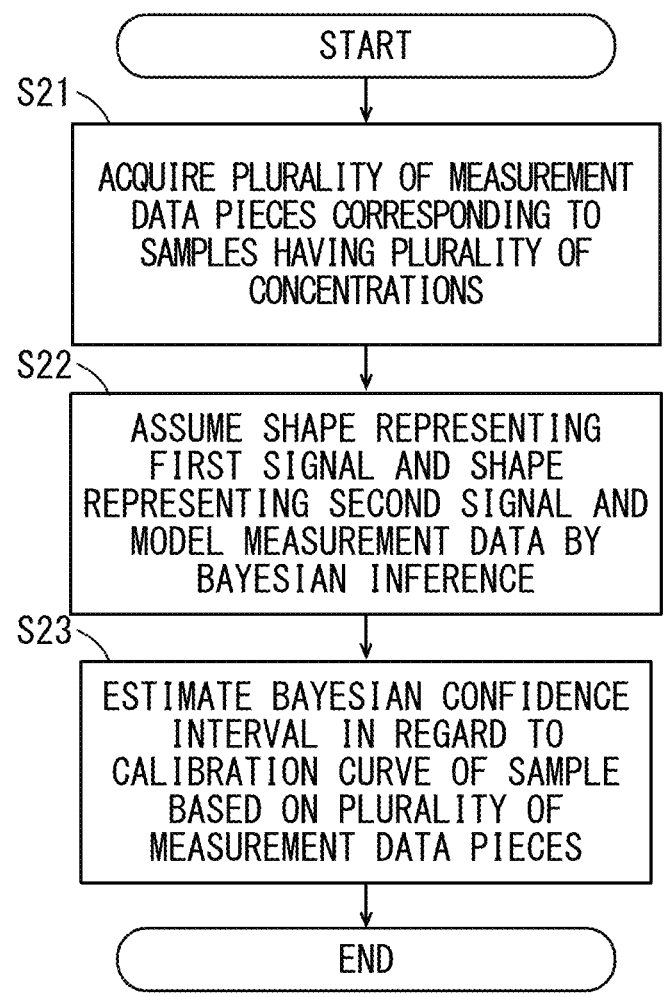

ANALYSIS METHOD AND DIAGNOSIS ASSISTANCE METHOD

BACKGROUND

Technical Field

The present invention relates to an analysis method and a diagnostic assistance method.

Description of Related Art

In an analysis device such as a chromatograph or a mass spectrometer, measurement data in regard to a sample to be analyzed is obtained. The measurement data is examined by a computer, and a chromatogram is acquired, a peak is detected, etc. When the measurement data is examined, a regression analysis or the like is performed on the measurement data. In WO 2018-087824 A1, an analysis method using the least squares is used.

SUMMARY

When measurement data is analyzed, variations in measurement data affect a result of analysis. Therefore, in a case in which an analysis highly dependent on the measured data is performed, reliability of a result of analysis may be degraded.

An object of the present invention is to provide an analysis method enabling a highly reliable result of analysis.

An analysis method according to one aspect of the present invention for analyzing a sample using a computer includes a first step of acquiring measurement data as a result of analysis of the sample, the measurement data including a first signal based on the sample and a second signal based on noise, the second signal added to the first signal, a second step of assuming a first shape representing the first signal and a second shape representing the second signal to model the measurement data using Bayesian inference, and a third step of estimating a probability distribution of characteristics of the sample based on the modeled measurement data.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 2 is a block diagram showing the configuration of the computer that performs the analysis method according to the present embodiment;

FIG. 3 is a diagram showing parameters of simulation data;

FIG. 4 shows the signal-to-noise ratios of the simulation data;

FIG. 5 is a diagram showing the waveform appearances of the simulation data;

FIG. 6 is a diagram showing the results of peak detection of the simulation data obtained in a comparative example;

FIG. 7 is a flowchart showing an analysis method according to a first embodiment;

FIG. 8 is a diagram showing posterior distributions of peak positions estimated by the analysis method according to the first embodiment;

FIG. 9 is a diagram showing the posterior distributions of peak heights estimated by the analysis method according to the first embodiment;

FIG. 10 is a flowchart showing an analysis method according to a second embodiment;

DETAILED DESCRIPTION

An analysis method and a diagnostic assistance method according to embodiments of the present invention will now be described with reference to the attached drawings.

(1) Computer Configuration

Figure 1:
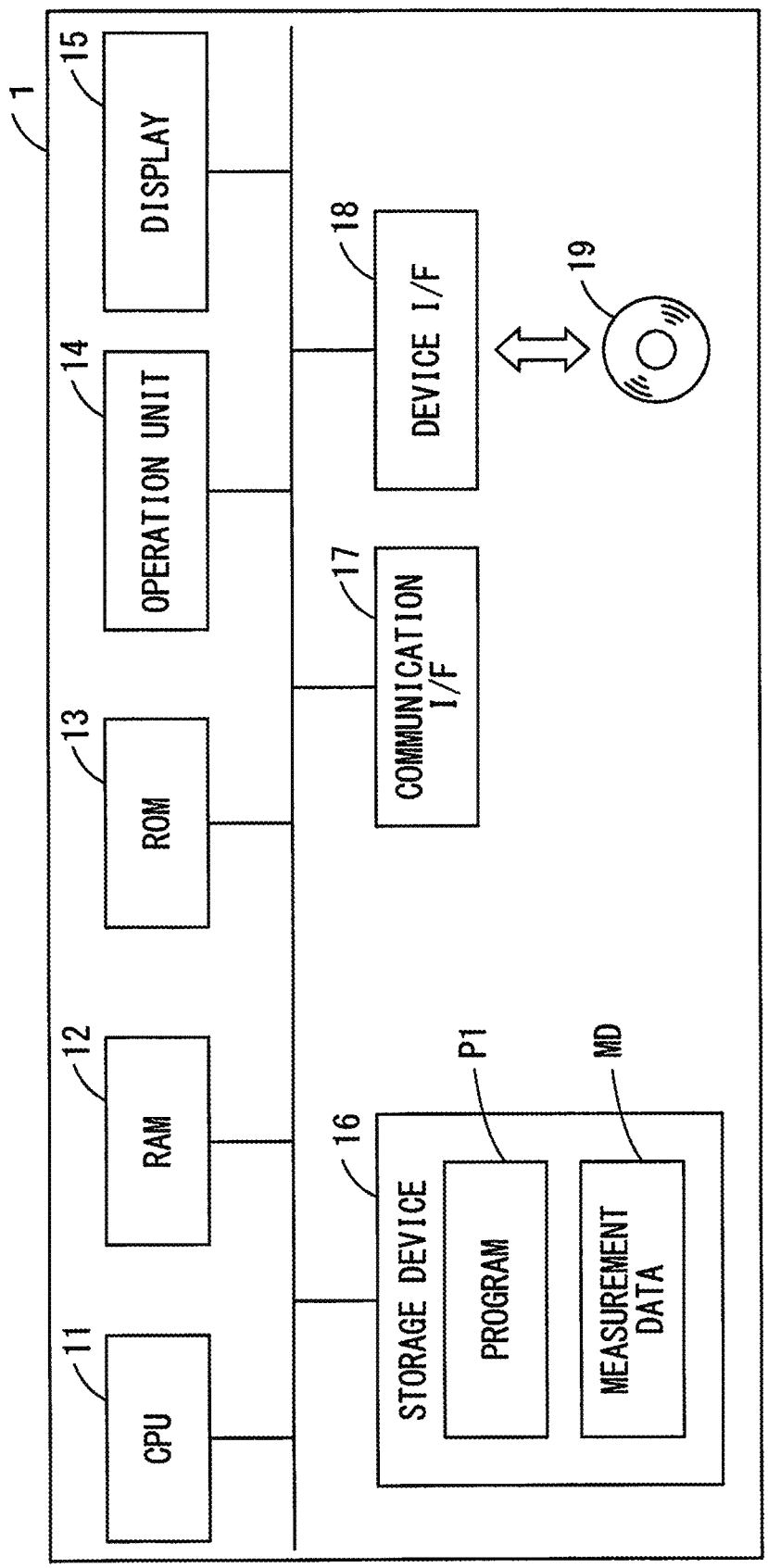
FIG. 1 is a diagram showing the configuration of a computer that performs an analysis method according to the present embodiment.

FIG. 1 is a diagram showing the configuration of a computer 1 according to an embodiment. The computer 1 is a personal computer, for example. The computer 1 of the present embodiment acquires measurement data MD of a sample obtained in a liquid chromatograph, a gas chromatograph, a mass spectrometer or the like. The computer 1 is a device for estimating a probability distribution of characteristics of a sample based on the measurement data MD of the sample.

As shown in FIG. 1, the computer 1 includes a CPU (Central Processing Unit) 11, a RAM (Random Access Memory) 12, a ROM (Read Only Memory) 13, an operation unit 14, a display 15, a storage device 16, a communication interface (I/F) 17 and a device interface (I/F) 18.

The CPU 11 controls the entire computer 1. The RAM 12 is used as a work area for execution of a program by the CPU 11. A control program and so on are stored in the ROM 13. The operation unit 14 receives an input operation of a user. The operation unit 14 includes a keyboard, a mouse, etc. The display 15 displays information such as a result of analysis. The storage device 16 is a storage medium such as a hard disc. A program P1 and the measurement data MD are stored in the storage device 16.

The program P1 models the measurement data MD using Bayesian inference. Further, the program P1 estimates a probability distribution of characteristics of a sample based on the modeled measurement data MD. The measurement data MD includes a first signal based on the sample and a second signal based on noise added to the first signal.

The communication interface 17 is an interface for communicating with another computer through wireless or wired communication. The device interface 18 is an interface for accessing a storage medium 19 such as a CD, a DVD or a semiconductor memory.

(2) Functional Configuration of Computer

FIG. 2 is a block diagram showing the functional configuration of the computer 1. In FIG. 2, a controller 20 is a function that is implemented by execution of the program P1 by the CPU 11 while the CPU 11 uses the RAM 12 as a work area. The controller 20 includes an acquirer 21, a modeler 22, an estimator 23 and an outputter 24. That is, the acquirer 21, the modeler 22, the estimator 23 and the outputter 24 are the functions implemented by execution of the program P1. In other words, each of the functions 21 to 24 is a function included in the CPU 11.

The acquirer 21 receives the measurement data MD. The acquirer 21 receives the measurement data MD from another computer, an analysis device and the like via the communication interface 17, for example. Alternatively, the acquirer 21 receives the measurement data MD saved in the storage medium 19 via the device interface 18. The measurement data MD is analysis data of a sample obtained over time in a liquid chromatograph, a gas chromatograph, a mass spectrometer or the like. In a case in which the measurement data MD is analysis data obtained in a chromatograph, the measurement data MD is a three-dimensional chromatogram having three dimensions of time, wavelength and absorbance (signal intensity). In a case in which the measurement data MD is analysis data obtained in a mass spectrometer, the measurement data MD is mass analysis data having three dimensions of time, mass-to-charge ratio and ionic strength (signal intensity). The acquirer 21 saves the received measurement data MD in the storage device 16. The acquirer 21 acquires the plurality of measurement data pieces (MD) corresponding to a plurality of samples having different concentrations.

The modeler 22 assumes a shape representing the first signal and a shape representing the second signal and models the measurement data MD using the Bayesian inference. The estimator 23 estimates the probability distribution of the characteristics of the sample based on the modeled measurement data MD. The outputter 24 outputs the probability distribution of the characteristics of the sample estimated by the estimator 23 to the display 15. Here, a statistic in regard to a peak position, a statistic in regard to a peak quantitative value or a calibration curve estimated based on the measurement data MD is an example of the characteristics of the sample. Further, a frequency of a peak position and a frequency of a peak quantitative value obtained by the Bayesian inference are examples of the statistic in regard to a peak position and the statistic in regard to a peak quantitative value.

The program P1 is saved in the storage device 16, by way of example. In another embodiment, the program P1 may be saved in the storage medium 19 for provision. The CPU 11 may access the storage medium 19 via the device interface 18 and may save the program P1 saved in the storage medium 19 in the storage device 16 or the ROM 13. Alternatively, the CPU 11 may access the storage medium 19 via the device interface 18 and may execute the program P1 saved in the storage medium 19.

(3) Simulation Data

In the present embodiment, simulation data shown in each of FIGS. 3 and 4 is used as the measurement data MD. This simulation data is commonly used in the first embodiment and the second embodiment, described below. FIG. 3 is a diagram showing the parameters of the simulation data. Here, as one example, simulation data in regard to six different concentrations C1 to C6 is used. The parameters shown in FIG. 3 are common parameters among the simulation data in regard to the concentrations C1 to C6.

$\mu$ shown in FIG. 3 is a mean value (peak position) of a Gaussian peak, and $\sigma$ is a standard deviation of the Gaussian peak. $\sigma'$ shown in FIG. 3 is a standard deviation of Gaussian noise. In this manner, the simulation data has a shape obtained when the Gaussian noise is added to the Gaussian peak. The parameters $\mu$ and $\sigma$ of the Gaussian peak and the parameter $\sigma'$ of the Gaussian noise are common among the concentrations C1 to C6. The simulation data of this example assumes the measurement data MD obtained by a mass spectrometer. As shown in FIG. 3, the simulation data is the data created in regard to the range of $-8 \leq m/z \leq 7.95$. Further, a bin width is 0.05, and the number of data points in an m/z direction is 320.

FIG. 4 is a diagram showing a Signal-to-Noise ratio (SN ratio) of the simulation data. As shown in FIG. 4, the SN ratios of the simulation data of the concentrations C1, C2, C3, C4, C5 and C6 are respectively 6, 5, 4, 3, 2 and 1. For example, in regard to the concentration C1, a signal:noise=6:1. That is, the magnitude of the SN ratio has a relationship with the concentration, which can be represented by C1>C2>C3>C4>C5>C6. Further, a weighing error of RSD (Relative Standard Deviation) of 0.5% is factored in the simulation data in regard to a sample having each concentration C1 to C6 as shown in FIG. 4. An SN ratio in which a weighing error is factored is an "actual SN ratio" shown in the diagram. The SN ratio of each concentration C1 to C6 is represented by (a Gaussian peak height (peak intensity))/(a standard deviation $\sigma'$ of the Gaussian noise).

FIG. 5 is a diagram showing the waveform appearances of the simulation data of the concentrations C1 to C6. As shown in FIG. 3, because the mean value $\mu$ of the Gaussian peak of the simulation data is 0, a peak is formed at m/z=close to 0 in regard to any of the waveforms of the concentrations C1 to C6 in FIG. 5. Although the peak shape can be seen clearly in regard to each of the concentrations C1, C2 and the like having a large SN ratio, the peak shape is buried in noise and it is difficult to see the shape in regard to each of the concentrations C5, C6 and the like having a small SN ratio.

(4) Comparative Example of Peak Detection

An analysis method of the measurement data MD not based on the Bayesian inference will be described as a comparative example before an analysis method of the present embodiment for modeling the measurement data MD based on the Bayesian inference is described. Here, in the comparative example, an analysis method with which MATLAB software (manufactured by MathWorks) is used is described, by way of example. Specifically, the mspeaks function and the mslowess function included in MATLAB are used.

FIG. 6 shows the results of peak detection estimated by application of the mspeaks function to the simulation data (measurement data MD) shown in FIGS. 3 to 5. In FIG. 6, white lines indicate estimated signals. Specifically, Matlab ver. 2014a and Matlab bioinfoaticis Toolbox ver. 2014a were used to obtain the results of detection shown in FIG. 6. First, smoothing was performed by the mslowess function. A smoothing kernal was gaussian, a window width (Span) was 0.08 and the other parameters were set to default settings. Thereafter, peak detection was performed with use of the mspeaks function set by default. Smoothing curves provided by the mslowess function are indicated by the white lines. Although not shown, a peak portion of the curve of a white line is detected as a peak position of the simulation data by the mspeaks function.

As shown in FIG. 6, with the method of the comparative example, the peak shape is clearly detected in regard to each of the concentrations C1, C2 and the like having a high SN ratio, and high reliability of peak detection of the simulation data is predicted. On the contrary, it is found that the reliability of peak detection with respect to the simulation data is low in regard to each of the concentrations C5, C6 and the like having a low SN ratio. In the comparative example, point estimates of the peak positions are obtained.

Therefore, it can be said that the reliability of a detection position is unknown, and that it is difficult to determine whether a peak position is correctly detected, particularly in regard to a signal having a low SN ratio. The same applies to a peak quantitative value.

(5) First Embodiment

Next, an analysis method according to the first embodiment will be described. The analysis method according to the first embodiment is a peak detection method using the Bayesian inference. FIG. 7 is a flowchart showing the analysis method according to the first embodiment. The process shown in FIG. 7 is executed by the functions 21 to 24 (see FIG. 2) included in the controller 20. That is, the process shown in FIG. 7 is a process realized by execution of the program P1 by the CPU 11.

In the step S11, the acquirer 21 acquires measurement data MD including a first signal based on a sample and the second signal based on noise added to the first signal. The step S11 is an example of a first step of the present invention. The acquirer 21 acquires the measurement data MD from another computer or an analysis device, for example. The acquirer 21 saves the measurement data MD in the storage device 16.

The modeler 22 reads the measurement data MD saved in the storage device 16. Next, in the step S12, the modeler 22 assumes a shape representing the first signal and a shape representing the second signal and models the measurement data MD using the Bayesian inference. The step S12 is an example of a second step of the present invention. For example, the modeler 22 models the measurement data MD by using such a function represented by the formula 1.

$$y[n] \sim \text{Normal}(a*\text{Normal}(\mu_p, \sigma_p), \sigma_n) \ldots n=1, \ldots, N \quad \text{[Formula 1]}$$

In the formula 1, Normal (x, y) represents a standard normal distribution having a mean value x and a standard deviation y. y [n] represents a peak intensity of each data point (n) of the measurement data MD, and N represents the number of data points. This Bayesian model is a model in which noise of a standard normal distribution having a standard deviation $\sigma n$ is added to a peak of a shape obtained by multiplying of the standard normal distribution having a mean value pp and a standard deviation $\sigma p$ by 'a' as a whole. In this manner, the formula 1 is the Bayesian model corresponding to the simulation data shown in each of FIGS. 3 to 6.

Next, in the step S13, the estimator 23 estimates a probability distribution of a statistic in regard to a peak derived from a substance of interest in the measurement data MD. The step S13 is an example of a third step of the present invention. That is, the estimator 23 obtains a probability distribution of a statistic in regard to a peak by using the measurement data MD modeled by the modeler 22. FIG. 8 is a diagram showing probability distributions (posterior distributions) of peak positions estimated by the estimator 23. In FIG. 8, the abscissas indicate a peak position, and the ordinates indicate a frequency.

In order to obtain the probability distributions shown in FIG. 8, an appropriate prior distribution was supplied to the model represented by the formula 1 and the Bayesian inference was performed with use of simulation data. The Bayesian inference was performed by 4-chain execution of Markov chain Monte Carlo method (MCMC method) of 2000 steps for statistical calculation after a warm-up period of 500 steps. The histograms of FIG. 8 are obtained by executing 2000-steps calculation to the model and plotting the frequencies of peak positions output from the calculation.

In FIG. 8, each range surrounded by two broken lines represents an allowable range A1. As shown in FIG. 3, the peak positions of the simulation data in regard to the concentrations C1 to C6 are all 0. The allowable range A1 indicates an allowable range for detection of peak position. Because the peak center of the simulation data is at m/z=0, the peak center is also obtained at m/z=0 in each probability distribution shown in FIG. 8. However, a peak appears in the vicinity of m/z of a substance of interest in actuality.

The allowable range A1 is set by the user, for example. In FIG. 8, a score SC shown in the upper right of each graph indicates the rate at which a probability distribution is in the allowable range A1. In regard to the concentrations C1 to C3, SC=1, which indicates that all posterior distributions fall in the allowable range A1 as a result of the Bayesian inference. For example, in a case in which the "cumulative probability of a posterior distribution of peak positions in the allowable range A1" is equal to or larger than a threshold value of 0.9, it is determined that there is a peak in regard to each of the concentrations C1 to C5. In regard to the concentration C6, since SC=0.8759, it is determined that there is no peak. This determination process is an example of a fourth step of the present invention. Further, with the analysis method of the present embodiment, the presence or absence of a peak cannot only be determined based on the threshold value of 0.9 but the level of presence or absence of a peak can also be presented as the score SC. Therefore, information can also be presented on the reliability of determination.

For example, the outputter 24 displays the scores SC on the display 15 together with the histograms of the posterior distributions of the peak positions shown in FIG. 8. The user can visually confirm the reliability of determination in regard to the presence or absence of a peak by referring to a histogram. Further, the user can also confirm the reliability of determination in regard to the presence or absence of a peak by referring to a score SC.

FIG. 9 is a diagram showing probability distributions (posterior distributions) of peak quantitative values estimated by the estimator 23. In FIG. 9, the abscissas indicate a peak quantitative value, and the ordinates indicate a frequency. In this example, a peak height is used as a peak quantitative value. A peak area may be used as a peak quantitative value. The probability distributions shown in FIG. 9 are also acquired by the similar method to the method used for the results shown in FIG. 8. That is, as described above, an appropriate prior distribution is supplied to the model represented by the formula 1, and the Bayesian inference is performed with use of simulation data. The histograms shown in FIG. 9 are obtained by executing 2000-steps calculation to the model and plotting the frequencies of peak heights output from the calculation.

As shown in FIG. 3, the standard deviation σ' of the Gaussian noise of the simulation data is 10. Further, the true SN ratios of the concentrations C1 to C6 are 6, 5, 4, 3, 2 and 1, respectively. Therefore, the true peak heights of the concentrations C1 to C6 are 60, 50, 40, 30, 20 and 10, respectively. In FIG. 9, the dot-dashed lines indicate the true peak heights in the simulation data. In the histograms shown in FIG. 9, peaks are generally formed in the vicinity of the true peak heights.

Further, in FIG. 9, a 95% Bayesian confidence interval (95% CW) is shown at the top of the histogram in regard to each concentration. For example, in regard to the concentration C1, the 95% Bayesian confidence interval is between 55.9029 and 63.8005. Similarly, a 95% Bayesian confidence interval is shown in regard to a peak height for each concentration. In a case in which the cumulative probability of peak heights provided by the Bayesian inference is equal to or larger than a threshold value in this 95% Bayesian confidence interval, it can be determined that there is a peak. The threshold value may be appropriately set by the user. This determination process is an example of a fourth step of the present invention.

The chain lines shown in FIG. 9 indicate the peak heights obtained by the mspeaks function of the comparative example. As can be seen from the diagram, in the estimation of the peak heights using the Bayesian inference of the present embodiment, the results close to true peak heights are obtained in regard to the concentrations C1 to C5 in comparison with the comparative example. That is, in regard to each of the concentrations C1 to C5 in FIG. 9, it is found that the median value of posterior distribution of peak heights is closer to a true peak height than a peak height obtained with use of the mspeaks function. In this manner, according to the present embodiment, it is possible to estimate a peak quantitative value with high reliability by using the Bayesian inference. Further, because a peak quantitative value cannot only be estimated but a distribution and a confidence interval of the peak quantitative value can also be obtained, the reliability of estimation can also be presented to the user. In this manner, with the analysis method of the first embodiment, since a peak position or a peak quantitative value is obtained in a probability distribution, the reliability of a detected value can be evaluated.

For example, the outputter 24 displays the histograms of the posterior distributions of peak quantitative values shown in FIG. 9 on the display 15. The user can visually confirm the reliability of determination in regard to the presence or absence of a peak by referring to a histogram. Further, the outputter 24 may also display scores of cumulative probability included in the 95% confidence intervals on the display 15.

(6) Application Example and Modified Example of First Embodiment

The analysis method described in the first embodiment can be applied to assist diagnosis of a disease, for example. In a case in which it is determined that there is a peak derived from a substance of interest as a result of analysis by the Bayesian inference, it can be determined that a patient is affected with a target disease. In a case in which it is determined that there is no peak, it can be determined that the patient is not affected with the target disease. Alternatively, whether the patient is affected with a disease can also be determined based on whether a peak quantitative value exceeds a certain value. Which one is used as a determination method may be selected by the user depending on the type of a target disease or a data measurement method. According to the first embodiment, because the probability distribution of a statistic of a peak positions or a peak quantitative value is estimated based on the measurement data MD, it is possible to enhance the reliability of assistance of disease diagnosis. Examples of a target disease include infectious diseases caused by microorganisms or viruses, for example. In addition, the analysis method of the present embodiment can also be used to assist various disease diagnosis such as early diagnosis of diseases including cancer with use of a biomarker. For example, a clinical specimen can be measured in a mass spectrometer, and presence or absence of an MS peak or an intensity of an MS peak of a biomarker can be used to determine whether a patient is affected with a disease of interest. Alternatively, a specimen that may contain a particular microorganism, pathogen or virus can be measured in a mass spectrometer, and presence or absence of an MS peak or an intensity of the MS peak of a biomarker can be used to determine whether a patient is affected with a disease of interest.

In a case in which whether a patient is affected with a disease, etc. is determined based on a peak position with the method of the present embodiment, it is necessary to set the allowable range A1 described in FIG. 8 and the "cumulative probability of posterior distribution of a peak position in the allowable range A1." Here, example of these settings will be described. For example, in a mass spectrometer, the accuracy of a peak position to be measured is often estimated in terms of a mass spectrometry method and characteristics of a device. For example, even in a case in which a true peak position is obtained at m/z=100, the peak position that is actually measured is obtained at m/z=between 99.5 and 100.5. In a case in which a peak position obtained by a conventional method is in this range, a peak is considered to have been detected. Also in the method of the present embodiment, this range may be used as the allowable range A1. The difference from the conventional approach is that "the probability of presence of a peak position (peak apex, for example) in this allowable range" is evaluated in the present invention.

Next, the "cumulative probability of a posterior distribution of a peak position in the allowable range A1," which is a threshold value for determining presence or absence of a peak, may be set from a medical standpoint in a case in which whether a patient is affected with a disease needs to be determined, for example. For example, for diseases that progress rapidly to a serious condition and for which early treatment is important, it is considered to be desirable to diagnose a disease early in a case in which a patient is reasonably likely to be affected with the disease even by allowing misdiagnosis of unaffected as affected. In this case, it is considered appropriate to lower a threshold value to some extent. On the other hand, for diseases that progress slowly and take a long time to become serious even in a case in which a patient is affected, the disadvantages of misdiagnosis of unaffected as affected such as a mental burden on the patient, and the time and cost required for detailed examination, etc. are greater than the disadvantages of missing the disease at an early stage. In this case, it is considered to be appropriate to increase a threshold value to some extent, so that a patient is diagnosed to be affected with a disease only in a case in which the likelihood of being affected with the disease is somewhat high.

In the simulation data used in the above-mentioned embodiment, a model in which Gaussian noise is added to a Gaussian peak is used, by way of example. Therefore, similar settings are used in the Bayesian modeling represented by the formula 1. The shape of a signal of interest and noise added to the signal depend on an analysis device and a measurement method to be used. Therefore, when a model is applied to actual data, it is possible to more accurately estimate a peak position and a peak quantitative value by performing the Bayesian modeling in consideration of these details. For example, in case of a liquid chromatogram, the spectral shape is not a simple Gaussian shape but a shape extending toward a high RT. In case of an MS spectrum, because a signal is the count data of ions, it is predicted that the noise has a shape of Poisson distribution or a constant multiple of Poisson distribution.

In the above-mentioned embodiment, one substance of interest is included in a sample, and presence or absence of a peak in regard to the one substance of interest has been described. The analysis method of the present embodiment can also be applied to a case in which a peak quantitative value is represented by a combination of a plurality of peak quantitative values (ratio or the like). For example, in regard to a particular disease, the ratio of peak quantitative values of two substances α, β may be a condition for determining whether a patient is affected with the disease. In such a case, the Bayesian inference is performed on the ratio of the peak quantitative values of the two substances α and β with use of the analysis method according to the present embodiment, whereby the ratio of the peak quantitative values of the two substances α and β can be applied to diagnostic assistance.

(7) Second Embodiment

Next, an analysis method according to a second embodiment will be described. The analysis method according to the second embodiment is a method of creating a calibration curve using the Bayesian inference. FIG. 10 is a flowchart showing the analysis method according to the second embodiment. The process shown in FIG. 10 is executed by the functions 21 to 24 (see FIG. 2) included in the controller 20. That is, the process shown in FIG. 10 is a process realized by execution of the program P1 by the CPU 11.

In step S21, the acquirer 21 acquires a plurality of measurement data pieces MD corresponding to samples having a plurality of concentrations. The step S21 is an example of a first step of the present invention. Specifically, the acquirer 21 acquires the measurement data MD obtained when a second signal based on noise is added to a first signal based on a sample in regard to the samples having a plurality of different concentrations. The acquirer 21 acquires the measurement data MD from another computer or an analysis device, for example. The acquirer 21 saves the measurement data MD in the storage device 16.

The modeler 22 reads the measurement data MD saved in the storage device 16. Next, in the step S22, the modeler 22 assumes a shape representing the first signal and a shape representing the second signal and models the measurement data MD by the Bayesian inference. The step S22 is an example of the second step of the present invention. For example, the modeler 22 models the measurement data MD by using such a function represented by each of the formulas 2 to 6.

base_gaussian_intensity$[c,n]$=$a[c]$*Normal($\mu_p[c], \sigma_p[c]$) $n=1, \ldots, N \ldots c=1, \ldots, C$    [Formula 2]

$y[c,n]$~Normal(base_gaussian_intensity$[c,n], \sigma_n$)    [Formula 3]

peak_gaussian_height$[c]$=$\alpha[c]$/(sqrt($2\pi$)·$\sigma_p$)<    [Formula 4]

calibration_value$[c]$=$\alpha$*$c$+$\beta$    [Formula 5]

peak_gaussian_height$[c]$~Normal(calibration_value$[c], \sigma_c$)    [Formula 6]

In each of the formulas 2 to 6, Normal (x, y) represents a standard normal distribution having a mean value x and a standard deviation y. y [c, n] represents a peak intensity of each data point (n) of the measurement data MD of the concentration c. Further, C represents the number of concentrations in the measurement data MD (C=6 in the simulation data shown in FIGS. 3 to 5), and N represents the number of data points. The Bayesian model for peak detection is represented by the formula 2 and the formula 3, and in this model, noise of a standard normal distribution of a standard deviation a n is added to a peak (base_gaussian_intensity [c, n]) having a shape obtained by multiplying of a standard normal distribution having the mean value pp[c] and the standard deviation σp[c] by a[c] as a whole. pp[c] and op[c] are respectively mean values and standard deviations of the measurement data MD in regard to each concentration c, and a[c] is a coefficient determined by the concentration c. In the formula 4, the fitted Gaussian peak height (peak_gaussian_height) is obtained.

The Bayesian model in regard to a calibration curve is represented by the formula 5 and the formula 6. In the formula 5, α and β are constants, and the calibration curve (calibration_value) is modeled to increase linearly with respect to the concentration. Further, as represented by the formula 6, the Gaussian peak height (peak_gaussian_height) is a model in which noise of a standard normal distribution having the standard deviation ac is added to a calibration curve. In this manner, the Gaussian peak height is modeled to increase linearly with respect to a concentration. The formula 2 and the formula 3 are hierarchically connected to the formula 5 and the formula 6 through the formula 4. In this manner, in the present embodiment, the calibration curve of the measurement data MD is shown by a hierarchical Bayesian model.

Figure 11:
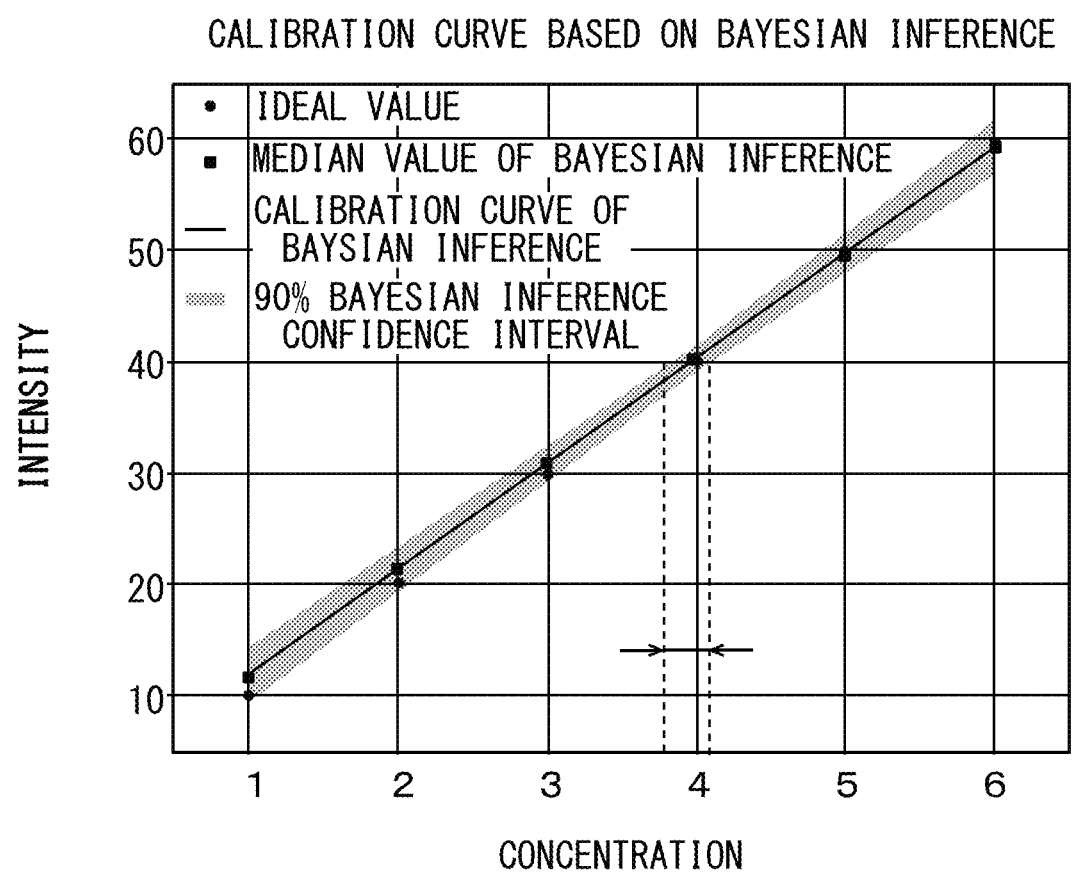
FIG. 11 is a diagram showing a confidence interval of a calibration curve estimated by the analysis method according to the second embodiment.

Next, in the step S23, the estimator 23 estimates a Bayesian confidence interval in regard to a calibration curve of a sample based on the measurement data MD in regard to a plurality of different concentrations. The step S23 is an example of a third step of the present invention. That is, the estimator 23 obtains a probability distribution of a calibration curve by using the measurement data MD in regard to a plurality of different concentrations modeled by the modeler 22. FIG. 11 is a diagram showing a probability distribution (posterior distribution) of a calibration curve estimated by the estimator 23. In FIG. 11, the abscissa indicates a concentration, and the ordinate indicates an intensity (peak quantitative value).

In order to obtain the probability distribution shown in FIG. 11, an appropriate prior distribution is supplied to the model represented by each of the formulas 2 to 6 and the Bayesian inference is performed with use of simulation data. As for the simulation data, the data shown in FIGS. 3 to 5 is used similarly to the first embodiment. The Bayesian inference is performed by 4-chain execution of Markov chain Monte Carlo method (MCMC method) of 2000 steps for statistical calculation after a warm-up period of 500 steps. The probability distribution of the calibration curve shown in FIG. 11 is obtained by calculation of 2000 steps to the model. In FIG. 11, a black dot indicates an ideal value (true value) based on the simulation data, and a black square indicates a median value of the Bayesian inference. Further, the Bayesian inference calibration curve is indicated by the black line, and the 90% Bayesian inference confidence interval is indicated by the gray region. In this manner, the Bayesian inference calibration curve takes into account the uncertainty derived from a weighing error.

(8) Comparative Example of Second Embodiment

As a comparative example of the second embodiment, MATLAB software (manufactured by MathWorks) is used as an analysis method of the measurement data MD not based on the Bayesian inference, similarly to the above-mentioned "(4) Comparative Example of Peak Detection." Specifically, the mslowess function and the mspeaks function included in MATLAB are used. The method of using the mslowess function and the mspeaks function is the same as described above.

Figure 12:
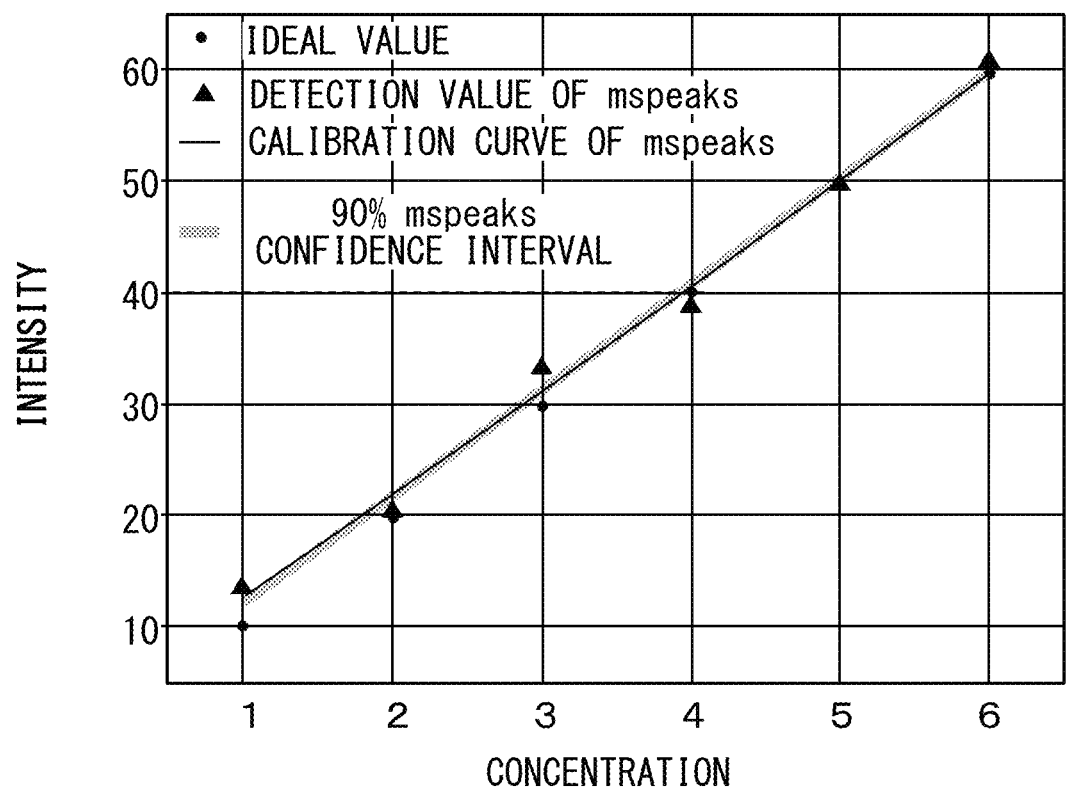
FIG. 12 is a diagram showing the confidence interval of a calibration curve estimated by a comparative example.

FIG. 12 shows a calibration curve estimated by application of the mspeaks function to the simulation data (measurement data MD) shown in each of FIGS. 3 to 5. In FIG. 12, a black dot represents an ideal value (true value) based on the simulation data, and a black triangle represents an intensity (peak height) of each concentration detected by the mspeaks function. Further, the black line represents an estimated calibration curve, and the gray region represents the 90% confidence interval obtained by the mspeaks function.

The 90% Bayesian inference confidence interval shown in FIG. 11 has a wider region than the 90% confidence interval of the calibration curve shown in FIG. 12. This is because the method of the comparative example does not take into account a weighing error in the confidence interval. On the contrary, the estimation of the calibration curve by the Bayesian inference of the present embodiment can incorporate a weighing error by the hierarchical Bayesian model. The 90% confidence interval of the calibration curve based on the Bayesian inference shown in FIG. 11 includes an ideal value of intensity based on the simulation data in regard to any concentration. However, there is a concentration that does not include an ideal value in the 90% confidence interval of the calibration curve based on the comparative example shown in FIG. 12. In this manner, in the method of estimating a calibration curve based on the Bayesian inference of the present embodiment, it can be said that uncertainty is reflected in the model in comparison with the comparative example.

In the comparative example, peak detection of the measurement data MD, creation of a calibration curve and estimation of a confidence interval in regard to each concentration are performed independently and sequentially. Although a weighing error, that is, a small random deviation from an ideal concentration is included in a sample having each concentration, because each process is performed independently, the weighing error is not reflected in the model. Therefore, the width of estimated confidence interval is underestimated. On the contrary, in the second embodiment, it is possible to simultaneously perform quantification of peak and linear fitting in regard to each concentration in consideration of the presence of a weighing error and create a calibration curve with the weighing error factored in a model by using the hierarchical Bayes model.

(9) Application Example and Modified Example of Second Embodiment

The analysis method of the second embodiment can be applied to creation of a calibration curve of the measurement data MD acquired from an analysis device such as a liquid chromatograph, a gas chromatograph or mass spectrometer.

In regard to the simulation data used in the second embodiment, Gaussian noise is added to a Gaussian peak, by way of example. Therefore, the similar setting is used for the Bayesian modeling represented by each of the formula 2 and the formula 3. Such Bayesian modeling is merely one example. As described above, the shapes of a signal of interest and noise added to the signal can be suitably selected in accordance with an analysis device, a measurement method or the like to be used.

In the second embodiment, only one substance of interest is included in a sample, and a calibration curve is created based on a peak quantitative value of the one substance of interest. The analysis method of the present embodiment can also be applied to a case in which a peak quantitative value is represented by a combination of a plurality of peak quantitative values (ratio or the like).

The calibration curve estimated in the second embodiment has a Bayesian inference confidence interval. Therefore, when a peak quantitative value is obtained as a result of analysis, a concentration obtained from a calibration curve has a width of confidence interval. Therefore, when there are two samples the measured peak quantitative values of which are close to each other, the concentrations estimated by applying each of the peak quantitative values to the calibration curve may have an overlap interval with each other. With the analysis method according to the second embodiment, it is possible to determine presence or absence of a difference in concentration between samples or the relationship between the concentrations based on a degree of overlap. For example, even in a case in which a difference in peak quantitative value is present to a certain extent, when the above-mentioned overlap is also present to a certain extent, it may be possible to determine that the obtained estimated difference between the concentrations of the two samples merely appears by chance due to a weighing error or noise in a signal.

(10) Aspects

It is understood by those skilled in the art that the plurality of above-mentioned illustrative embodiments are specific examples of the below-mentioned aspects.

(Item 1) An analysis method according to one aspect for analyzing a sample using a computer includes a first step of acquiring measurement data as a result of analysis of the sample, the measurement data including a first signal based on the sample and a second signal based on noise, the second signal added to the first signal, a second step of assuming a first shape representing by the first signal and a second shape representing by the second signal to model the measurement data using Bayesian inference, and a third step of estimating a probability distribution of characteristics of the sample based on the modeled measurement data.

With this analysis method, a highly reliable result of analysis can be obtained. Further, because a result of estimation is obtained by distribution, uncertainty of the result of estimation can be evaluated.

(Item 2) The analysis method according to item 1, wherein the third step may include estimating a probability distribution of a statistic in regard to a peak position derived from a substance of interest in the measurement data.

A highly reliable result of analysis can be obtained in regard to a peak position.

(Item 3) The analysis method according to item 1, wherein the third step may include estimating a probability distribution of a statistic in regard to a peak quantitative value derived from a substance of interest in the measurement data.

A highly reliable result of analysis can be obtained in regard to a peak quantitative value.

(Item 4) The analysis method according to item 2 or 3 may include a fourth step of determining presence or absence of a peak derived from the substance by calculating a cumulative probability in a set range of a probability distribution of the statistic and comparing the cumulative probability with a set threshold value.

It is possible to determine presence or absence of a peak by comparing the cumulative probability with a threshold value. Reliability of determination can also be confirmed based on a score of cumulative probability.

(Item 5) The analysis method according to item 3, wherein a statistic based on a peak quantitative value derived from a plurality of substances may be used as the statistic.

A highly reliable result of analysis in regard to a peak quantitative value can be obtained in regard to a sample including a plurality of substances.

(Item 6) With a diagnostic assistance method according to another aspect, a patient may be determined to be affected with a target disease when it is determined in the fourth step according to item 4 that a peak is present.

The Bayesian inference can be used for diagnosis of a disease.

(Item 7) The diagnostic assistance method of item 6, wherein the disease may include an infectious disease.

The Bayesian inference can be used for diagnosis of an infectious disease.

(Item 8) The analysis method according to item 3 may include a fourth step of determining presence or absence of a peak derived from the substance by calculating a cumulative probability in a set range of a probability distribution of the statistic and comparing the cumulative probability with a set threshold value.

It is possible to determine presence or absence of a peak by comparing the cumulative probability with a threshold value. Reliability of determination can also be confirmed based on a score of cumulative probability.

(Item 9) A diagnostic assistance method according to another aspect, wherein a patient may be determined to be affected with a target disease when it is determined in the fourth step according to item 8 that a peak is present.

The Bayesian inference can be used for diagnosis of a disease.

(Item 10) The diagnostic assistance method according to item 9, wherein the disease may include an infectious disease.

The Bayesian inference can be used for diagnosis of an infectious disease.

(Item 11) The analysis method according to item 1, wherein the first step may include acquiring a plurality of measurement data pieces corresponding to samples having a plurality of concentrations, and the third step may include estimating a Bayesian confidence interval in regard to a calibration curve of the sample based on the plurality of measurement data pieces.

A highly reliable calibration curve can be obtained.

(Item 12) The analysis method according to item 11, wherein in the second step, the plurality of measurement data pieces may be modeled by a hierarchical Bayesian model.

The hierarchical Bayesian modeling enables modeling that also takes into account data uncertainty.

(Item 13) The analytical method according to item 11 or 12, wherein a relationship among concentrations of a plurality of samples may be determined based on a degree of overlap in the Bayesian confidence interval inferred in the third step.

The relationship among a plurality of samples can be determined.

(Item 14) The analysis method according to item 11 or 12, wherein in the third step, a Bayesian confidence interval in regard to a calibration curve based on peak quantitation values derived from a plurality of substances may be estimated.

A highly reliable calibration curve in regard to a peak quantitative value can be obtained in regard to a sample including a plurality of substances.

(Item 15) The analytical method according to item 11 or 12, wherein a calibration curve of the sample may be represented by a linear form.

(Item 16) The analytical method according to item 1, wherein the characteristics may include a statistic in regard to a peak position estimated based on the measurement data, a statistic in regard to a peak quantitative value or a calibration curve.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. An analysis method for determining a target compound using a computer, including:
   a first step of acquiring a chromatogram by an analysis of a sample using a chromatograph;
   a second step of assuming a function representing a shape of a target peak in the chromatogram, the function including a parameter representing a retention time of the target peak;
   a third step of estimating a probability distribution of the parameter;
   a fourth step of receiving an allowable range by a user, the allowable range having a retention time window in which the target compound is expected to have a peak;
   a fifth step of integrating a probability value over the allowable range in the probability distribution; and
   a sixth step of determining a presence of the target compound in a case where the integrated probability value is equal to or larger than a threshold value.

2. The analysis method according to claim 1, wherein the third step includes estimating a probability distribution of a statistic in regard to a peak quantitative value derived from a substance of interest in the chromatogram.

3. The analysis method according to claim 2, wherein a statistic based on the peak quantitative value derived from a plurality of substances is used as the statistic.

4. The analysis method according to claim 2, wherein the sixth step further comprises determining a presence of a peak derived from the substance by calculating a cumulative probability in a set range and comparing the cumulative probability with a set threshold value.

5. A diagnostic assistance method comprising the analysis method of claim 4, wherein a patient is determined to be affected with a target disease when it is determined in the sixth step that the peak is present.

6. The diagnostic assistance method according to claim 5, wherein the target disease includes an infectious disease.

7. The analysis method according to claim 1, wherein:
   the first step includes acquiring a plurality of measurement data pieces corresponding to samples having a plurality of concentrations, and
   the third step includes estimating a Bayesian confidence interval in regard to a calibration curve of the sample based on the plurality of measurement data pieces.

8. The analysis method according to claim 7, wherein in the second step, the plurality of measurement data pieces are modeled by a hierarchical Bayesian model.

9. The analysis method according to claim 7, wherein a relationship among concentrations of a plurality of samples is determined based on a degree of overlap in the Bayesian confidence interval inferred in the third step.

10. The analysis method according to claim 7, wherein in the third step, the Bayesian confidence interval in regard to the calibration curve based on peak quantitative values derived from a plurality of substances is estimated.

11. The analysis method according to claim 7, wherein the calibration curve of the sample is represented by a linear form.

12. The analysis method according to claim 1, wherein characteristics of the sample based on the chromatogram include a statistic in regard to a peak position estimated based on the chromatogram, and a statistic in regard to a peak quantitative value or a calibration curve.

13. The analysis method according to claim 1,
wherein a mean value indicates a peak position derived from a substance of interest in the chromatogram.

14. The analysis method according to claim 13, wherein the sixth step further comprises determining a presence of a peak derived from the substance by calculating a cumulative probability in a set range of a probability distribution of a statistic in regard to a peak quantitative value derived from the substance and comparing the cumulative probability with a set threshold value.

15. A diagnostic assistance method comprising the method of claim 14, wherein a patient is determined to be affected with a target disease when it is determined in the sixth step that the peak is present.

16. The diagnostic assistance method of claim 15, wherein the target disease includes an infectious disease.

17. An analysis method for analyzing a sample, including:
acquiring measurement data by analysis of the sample using a chromatograph;
assuming a function representing a shape representing the measurement data to generate an inference model from the measurement data using Bayesian inference;
estimating a probability distribution of a term of the function, the term of the function including a mean value;
determining whether or not there is a peak derived from a substance of interest in the measurement data based on the probability distribution of the mean value; and
determining presence or absence of the peak derived from the substance of interest in the measurement data by calculating a cumulative probability in a set range of the probability distribution of a statistic in regard to a peak quantitative value derived from the substance and comparing the cumulative probability with a set threshold value.

18. The analysis method according to claim 17,
wherein an abscissa of a graph of the probability distribution indicates a peak position, and an ordinate of the graph of the probability distribution indicates a frequency.

19. The analysis method according to claim 18,
wherein the measurement data includes a chromatogram, and
wherein the mean value indicates the peak position derived from the substance of interest in the measurement data.

\* \* \* \* \*